6119X
No Printed Specification Available
E. Dewey.
Churn.
No. 6,119-X. Patented Oct. 1, 1830.
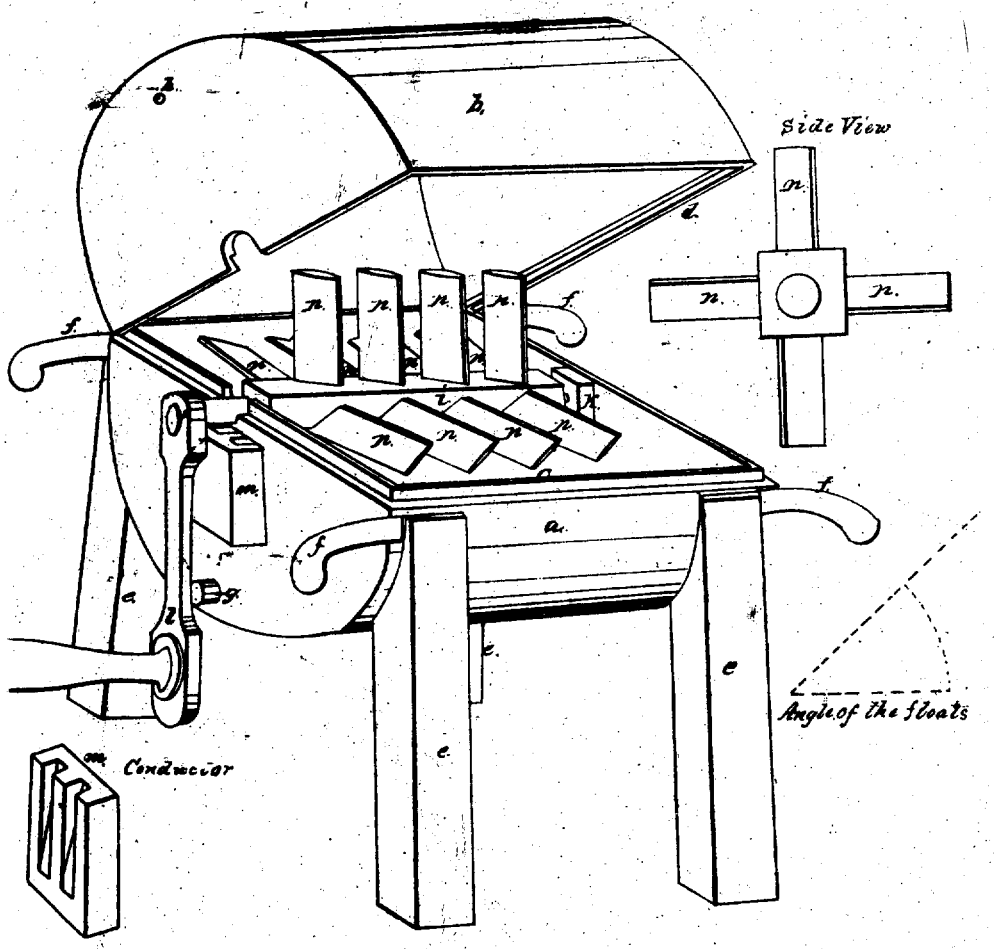

Ebenezer Dewey
Letters Patent

6119X

The schedule referred to in these Letters Patent and making part of the same containing a description in the words of the said Ebenezer Dewey himself of his improvement in the Churn called the "Float Wheel Churn"

---

Said churn consists of a concave cylinder or barrel which opens horizontally thro' the centre lengthwise and is thereby divided into two equal parts which I denominate the upper & lower part of the churn. To prevent the milk & cream escaping from the churn when it is in operation the upper part is inserted or let into the lower part by a lip or projection (from the inner side of the lower edge of the said upper part) which exactly fits & fills a rabbitting upon the inner side of the upper edge of said lower part which rabbitting & projection are an inch or more wide so that when the churn is shut the joint between the upper & lower parts is covered by the said projection & is rendered nearly tight. To the ends of the lower part of the churn are attached 4 legs 2 upon each end 2 feet long which raise the churn a suitable height from the floor for convenience. On the sides of the churn 2 upon each part are 4 handles with which to move lift or open the churn. In the lower side of one end of the churn is an inch hole with a plug or top to it thro' which the butter milk &c is let out of the same & in the top of the upper part is a small hole to permit the air to escape from the churn when it is in motion. The size of a common churn is 18 inches in diameter & 12 inches in length on the inside but these dimensions may be varied at pleasure. The float wheel by which the operation of churning is effected consists of an axis or shaft which passes thro' the centre of the cylinder at right angles to its diameter. The inner end of the shaft is fastened to its place in the centre by being inserted into a bearing on the centre of the inside of one end of the cylinder. The other end of the shaft to which the crank is attached projects from the cylinder 2 or 3 inches & rests upon a bearing in the other head of the cylinder. One half of which bearing is in the [illegible] upper

6119X upper & the other half in the lower part of the cylinder. On the end of the churn
next to the crank & thro' which the shaft passes is placed a conductor which leads
into the lower part of the cylinder. Said conductor is placed under the entrance
of the shaft & conveys back into the churn the cream or milk which escapes thro'
between the shaft & its bearing on that end of the churn. Said conductor is
made by nailing or fastening in any other way a piece of board 3 or 4 inches
wide & 6 long grooved or fluted on one side for 3 inches in length & 2 in
width at the top & terminating in a point at 4 inches from the top where a
hole is cut thro' into the churn & permits whatever escapes from the cylin-
der as above stated to pass back into the churn. Into the axis which is 4 square are inserted
4 rows of floats or paddles each row being directly opposite to another row,
each row consists of 3, 4, or more or less floats 2 inches wide & half an inch
thick in the middle & an eighth of an inch thick at the edges & stand at
right angles to the shaft lengthwise of the floats and in an angle of 45 degrees
widthwise of them so that when the floats lie horizontally the upper edge
of each is elevated above the lower edge in an angle of 45 degrees with
the surface of the cream & when the wheel is in operation the floats do not
strike square against the cream but partly edgewise and partly sideways
requiring but little power to operate it & as each row of floats stands diagon-
ally with the axis in a manner contrary or different from the row next to
it each succeeding row of floats moves the cream in a direction con-
trary or opposite to the last preceding row & every revolution of the wheel
gives the cream 4 motions besides dividing the cream as many times as
there are floats in the wheel which keeps the cream or milk in continual
agitation with the application of very little power. The churn is op-
ened (& cream put into it) shut again with the wheel in its place & the
operation performed by means of the crank. The wheel is [illegible] at pleas-
ure & the churn cleansed with all immaginable ease. The wheel may
be made with more or less rows of floats & with more or less floats in a row
& the different parts of the churn may be varied in every respect.
The method of agitating milk or cream in the manner above described
may be applied to all other churns. The crank or windlass should
be from 8 to 9 inches long according to the size of the churn. [illegible]

6119X

285.

ing that the above is a true specification of the improvement for which Josiah Robert Valentine & application Have hereunto setting hand & seal this 24th day of August 1830.

Witnesses

Benjah Davis

John A. Davis

Ebenezer Dewey

Ex L

Ch. IV.

1005 nd